(12) United States Patent
Yamagami (10) Patent No.: US 8,700,725 B2
(45) Date of Patent: *Apr. 15, 2014

(54) REMOTE COPY SYSTEM

(75) Inventor: Kenji Yamagami, Los Gatos, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/336,408

(22) Filed: Dec. 23, 2011

(65) Prior Publication Data

US 2012/0096308 A1 Apr. 19, 2012

Related U.S. Application Data

(63) Continuation of application No. 12/559,043, filed on Sep. 14, 2009, now Pat. No. 8,108,486, which is a continuation of application No. 11/540,073, filed on Sep. 28, 2006, now Pat. No. 7,606,940, which is a continuation of application No. 11/397,535, filed on Apr. 3, 2006, now Pat. No. 7,152,120, which is a continuation of application No. 10/602,223, filed on Jun. 23, 2003, now Pat. No. 7,065,589.

(51) Int. Cl.
*G06F 15/167* (2006.01)

(52) U.S. Cl.
USPC .......... 709/212; 709/224; 709/246; 711/162; 711/165; 711/161; 707/616

(58) Field of Classification Search
USPC .......... 709/212, 224, 246; 711/162, 161, 165; 707/616

See application file for complete search history.

(56) References Cited

U.S. PATENT DOCUMENTS

| | | | |
|---|---|---|---|
| 5,630,092 A | 5/1997 | Carreiro et al. | |
| 5,937,414 A * | 8/1999 | Souder et al. | 707/616 |
| 6,092,213 A | 7/2000 | Lennie et al. | |
| 6,209,002 B1 | 3/2001 | Gagne et al. | |
| 6,282,610 B1 * | 8/2001 | Bergsten | 711/114 |
| 6,304,942 B1 | 10/2001 | DeKonong | |
| 6,304,980 B1 | 10/2001 | Beardsley et al. | |
| 6,623,349 B2 * | 9/2003 | Fletcher | 453/17 |
| 6,633,538 B1 | 10/2003 | Tanaka et al. | |
| 6,647,474 B2 * | 11/2003 | Yanai et al. | 711/162 |
| 6,654,752 B2 * | 11/2003 | Ofek | 1/1 |
| 6,684,306 B1 | 1/2004 | Nagasawa et al. | |
| 6,745,303 B2 * | 6/2004 | Watanabe | 711/161 |
| 6,785,768 B2 | 8/2004 | Peters et al. | |

(Continued)

FOREIGN PATENT DOCUMENTS

JP 10-49418 2/1998
WO 2004/017194 2/2004

*Primary Examiner* — Tammy Nguyen
(74) *Attorney, Agent, or Firm* — Mattingly & Malur, PC (57) ABSTRACT

A remote copy system includes a first storage system including a first storage controller arid a first data volume. The first storage controller is configured to control data access requests to the first data volume. The first storage system is configured to store write data in the first data volume upon receiving a write request from a first host associated with the first storage system and generate a journal including control data and journal data A second storage system includes a journal volume and configured to receive and store the journal generated by the first storage system in the journal volume. A third storage system includes a second data volume and configured to receive the journal from the second storage system and store the journal data of the journal to the second storage system according to information provided in the control data.

16 Claims, 11 Drawing Sheets

(56) References Cited

U.S. PATENT DOCUMENTS

| | | |
|---|---|---|
| 6,799,245 B1 | 9/2004 | Kochiya |
| 6,823,349 B1 | 11/2004 | Taylor et al. |
| 6,912,668 B1 | 6/2005 | Brown et al. |
| 7,065,589 B2 * | 6/2006 | Yamagami ............... 709/246 |
| 7,082,506 B2 * | 7/2006 | Nakano et al. ............... 711/162 |
| 7,152,120 B2 | 12/2006 | Yamagami |
| 7,606,940 B2 | 10/2009 | Yamagami |
| 2002/0016827 A1 | 2/2002 | McCabe et al. |
| 2002/0018827 A1 * | 2/2002 | Yasuda et al. ............... 425/552 |
| 2003/0005111 A1 * | 1/2003 | Allan ............... 709/224 |
| 2003/0051111 A1 | 3/2003 | Nakano et al. |
| 2004/0103164 A1 | 5/2004 | Tabuchi et al. |
| 2004/0260902 A1 * | 12/2004 | Stanley et al. ............... 711/165 |
| 2006/0212462 A1 | 9/2006 | Heller et al. |

\* cited by examiner

REMOTE COPY SYSTEM

CROSS-REFERENCES TO RELATED APPLICATIONS

This application is a continuation of U.S. patent application Ser. No. 12/559,043, filed Sep. 14, 2009, which is a continuation of U.S. patent application Ser. No. 11/540,073, filed Sep. 28, 2006 (now U.S. Pat. No. 7,606,940), which is a continuation of U.S. patent Ser. No. 11/397,535, filed Apr. 3, 2006 (now U.S. Pat. No. 7,152,120) which is a continuation of U.S. patent application Ser. No. 10/602,223, filed Jun. 23, 2003 (now U.S. Pat. No. 7,065,589), the entire disclosures of which are incorporated herein by reference.

BACKGROUND OF THE INVENTION

The present invention relates to a storage system, more particularly to a storage system configured to perform a remote copy function.

Data is the underlying resources on which all computing processes are based. With the recent explosive growth of the Internet and e-business, the demand on data storage systems has increased tremendously. Generally, storage networking encompasses two applications or configurations: network-attached storage (NAS) or storage area network (SAN). A NAS uses IP over Ethernet to transports data in file formats between storage servers and their clients. In NAS, an integrated storage system, such as a disk array or tape device, connects directly to a messaging network through a local area network (LAN) interface, such as Ethernet, using messaging communications protocols like TCP/IP. The storage system functions as a server in a client-server system.

Generally, a SAN is a dedicated high performance network to move data between heterogeneous servers and storage resources. Unlike NAS, a separate dedicated network is provided to avoid any traffic conflicts between client and servers on the traditional messaging network. A SAN permits establishment of direct connections between storage resources and processors or servers. A SAN can be shared between servers or dedicated to a particular server. It can be concentrated in a single locality or extended over geographical distances. SAN interfaces can be various different protocols, such as Fibre Channel (FC), Enterprise Systems Connection (ESCON), Small Computer Systems Interface (SCSI), Serial Storage Architecture (SSA), High Performance Parallel Interface (HIPPI), or other protocols as they emerge in the future. For example, the Internet Engineering Task Force (IETF) is developing a new protocol or standard iSCSI that would enable block storage over TCP/IP, while some companies are working to offload the iSCSI-TCP/IP protocol stack from the host processor to make iSCSI a dominant standard for SANs.

Regardless of the type of storage system used, the data storage system users are acutely interested in maintaining back-up data in order to prevent loss of valuable data from failure in storage unit (or storage subsystem). Accordingly, the data storage systems generally includes back-up units to store data for emergency recovery when the primary units experience failure. The failure, however, may result from occurrence of natural disasters, e.g., earth quake or storm, in the area where the storage unit is provided, as well as from the break-down of the unit itself. If the back-up units are placed nearby the primary units, both of them may be destroyed when the natural disaster strikes. Accordingly, many storage system users prefer to place the primary units and the back-up units separated over along distance, e.g., over 100 miles apart. In fact, some users have even placed the primary and back-up units in different continents.

Currently, two operational modes are used by storage systems to copy the data to the back-up or secondary sites: synchronous mode and asynchronous mode. In synchronous mode, a write request from a host to the primary storage system completes only after write data are copied to the secondary storage system and acknowledge thereof has been made. Accordingly, this mode guarantees no loss of data at the secondary system since the write data from the host is stored in the cache of the primary system until the acknowledgement has be received from the secondary system. In addition, the primary volume (PVOL) in the primary storage system and the secondary volume (SVOL) in the secondary storage system are identically maintained, so that the SVOL can be promptly used to replace the PVOL if the PVOL experiences failure. However, the primary and secondary storage systems cannot be placed too far apart, e.g., over 100 miles, under this mode. Otherwise, the storage system efficiently execute write requests from the host.

In asynchronous mode, a write request from a host to the primary storage system completes upon storing write data only to the primary system. The write data is then copied to the secondary storage system. That is, the data write to the primary storage system is an independent process from the data copy to the secondary storage system. Accordingly, the primary and secondary systems may be placed far apart from each other, e.g., 100 miles or greater. However, data may be lost if the primary system does down since the PVOL and SVOL identically maintained. Accordingly, it would be desirable to provide a data storage system or remote copy system that provides the benefits of the synchronous and asynchronous modes, i.e., enables the primary and secondary systems to be placed far apart while guaranteeing no data loss.

BRIEF SUMMARY OF THE INVENTION

Embodiments of the present invention relate to a storage system configured to perform a remote copy function. In one embodiment, a primary storage system synchronously sends write data along with its control data to an intermediary storage system. The intermediary storage system stores the write data and the control data to a volume, e.g., journal volume (JNL). The intermediary storage system maintains the order of arrival of the data and assigns or associates order information to each of the control data. Subsequently, the intermediary storage system sends write data and its corresponding control data to a secondary storage system asynchronously or independent of the storing of the write and control data in the primary storage system. The secondary storage system stores the write data a secondary volume (SVOL) according to the control data and the order information associated with the control data.

As used herein, the term "storage system" refers to a computer system configure to store data and includes one or more storage units or storage subsystems, e.g., disk array units. Accordingly, the storage system may refer to a computer system including one or more hosts and one or more storage subsystems, or only a storage subsystem or unit, or a plurality of storage systems or units coupled to each other via a communication link.

As used herein, the term "storage subsystem" refers to a computer system that is configured to storage data and includes a storage area and a storage controller for handing requests from one or more hosts. An example of the storage subsystem is a disk array unit.

As used herein, the term "host" refers to a computer system that is coupled to one or more storage systems or storage subsystems and is configured to send requests to the storage systems or storage subsystems. The host may be a server or client.

As used herein, the term "remote copy system" refers to a computer system that is configured to perform a remote copy function. The remote copy system may refer to a single storage system, subsystem or unit, or a plurality of storage units, systems, or subsystems that are linked by a network or communication link. Accordingly, the remote copy system may refer to a primary storage system, a secondary storage system, an intermediary system, or a combination thereof. The remote copy system also may include one or more hosts.

In one embodiment, volumes in the primary storage system 110a are mirrored to the secondary storage system 110b using the intermediary storage system 110c. The intermediary storage system 110c is generally located relatively close to the primary storage system 110a, while the secondary storage system 110b is located relatively far away from the intermediary storage system 110c and/or the primary storage system. The write data is copied from the primary storage system 110a to the intermediary storage system 110c synchronously when a write request is received from a host that is associated with the primary storage system. The write data that is copied to the intermediary system is in a form of journal information including control data and journal data. The write data corresponds to the journal data, and control data provides administrative information about the journal data. The journal is then copied from the intermediary system 110c to the secondary storage system 110b asynchronously with respect to the host write request. The write data is secure unless both primary and intermediary storage systems 110c are damaged during the above copy process. In one implementation, the intermediary system includes one or more journal volumes and does not include data volumes, thereby lowering the equipment cost.

In one embodiment, a remote copy system includes a first storage system including a first storage controller and a first data volume. The first storage controller is configured to control data access requests to the first data volume. The first storage system is configured to store write data in the first data volume upon receiving a write request from a first host associated with the first storage system and generate a journal including control data and journal data. A second storage system includes a journal volume and configured to receive and store the journal generated by the first storage system in the journal volume. A third storage system includes a second data volume and configured to receive the journal from the second storage system and store the journal data of the journal to the second storage system according to information provided in the control data.

In one embodiment, a storage system includes a first storage controller to receive data access requests from a first host; a first storage area that is associated with the first storage controller and configured to store information according to controls of the first storage controller, the first storage area including a primary volume, a second storage controller provided at least 100 miles away from the first storage controller; and a second storage area that is associated the second storage controller and configured to store information according to the controls of the second storage controller, the second storage area including a secondary volume. The secondary volume mirrors the primary volume. The first storage controller is configured to store write data associated with a write request from the first host in the primary volume and generate a journal including control data and journal data in response to the write request, the journal data corresponding to the write data, the journal being transmitted synchronously to an journal volume provided external to the first storage area.

In another embodiment, a method for operating a remote copy system includes generating a journal including control data and journal data at a primary storage system after receiving a write request from a primary host associated with the primary storage system; and transmitting the journal to an intermediary storage system for data mirroring between the primary storage system and a secondary storage system, the secondary storage system being remotely located from the intermediary storage system.

DETAILED DESCRIPTION OF THE INVENTION

Figure 1A:
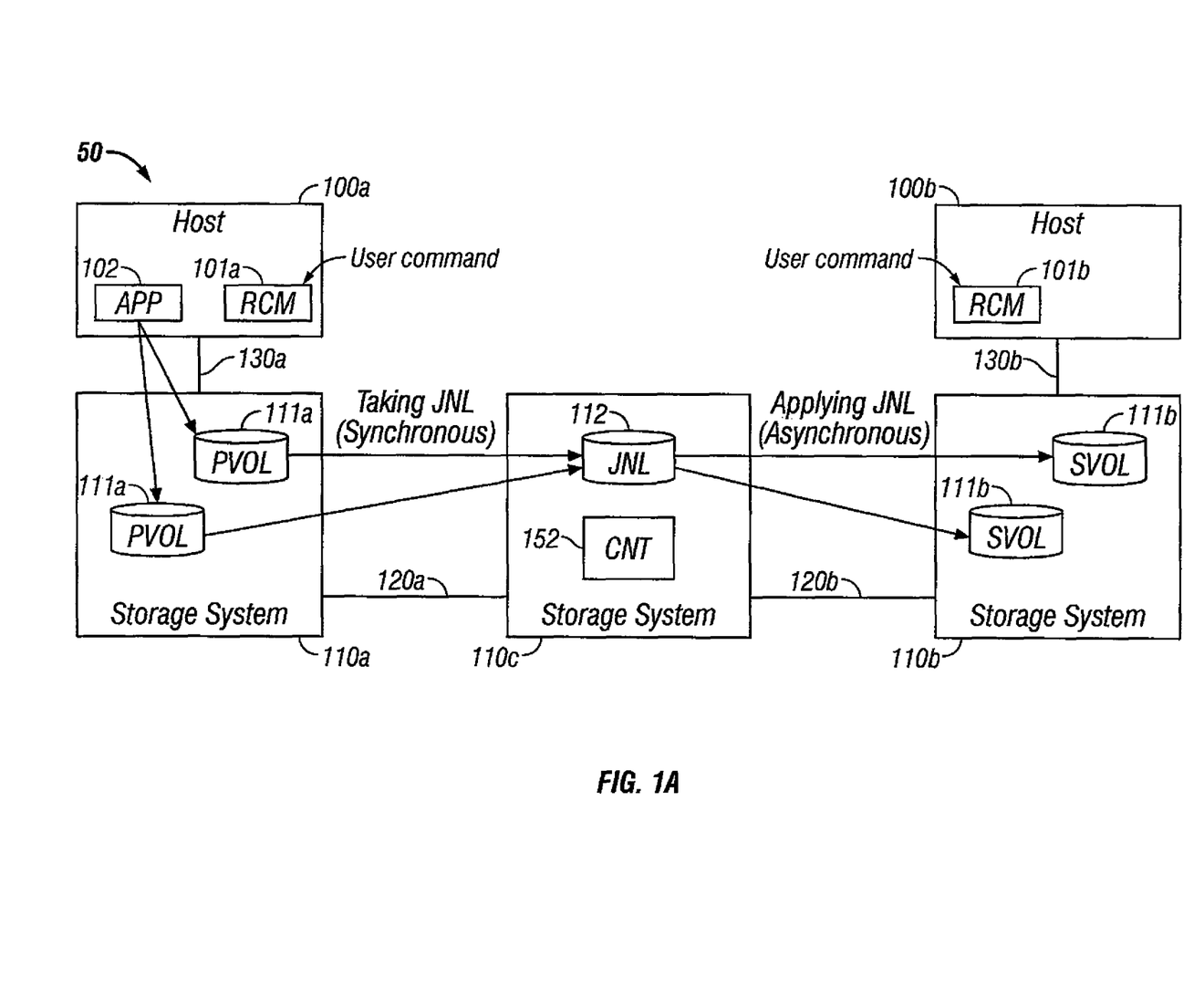
FIG. 1A illustrates a remote copy system having three data centers according to one embodiment of the present invention.

FIG. 1A illustrates a remote copy system 50 includes a plurality of storage systems according to one embodiment of the present invention. The remote copy system includes a primary storage system 110a, secondary storage system 110b and an intermediary storage system 110c. The storage systems are coupled to each other via communication links 120a and 120b. In one embodiment, the link 120a is a Fibre Channel, and the link 120b is a public communication link since the former is considerably shorter than the latter, as explained below. The storage systems 110a, 110b, and 110c are disk array units or storage subsystems in the present embodiment.

Figure 1B:
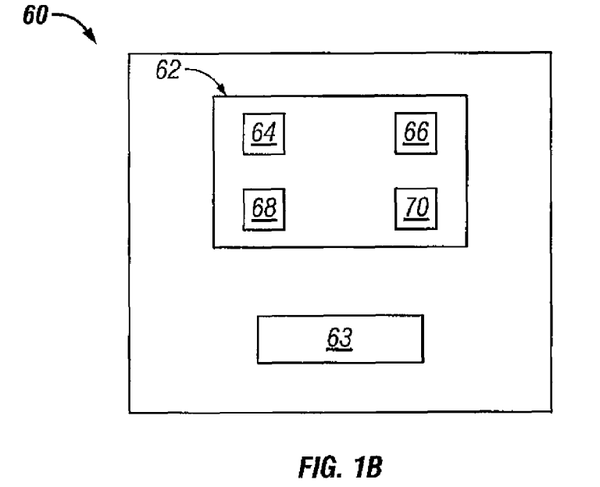
FIG. 1B illustrates an exemplary storage subsystem according to one embodiment of the present invention.

FIG. 1B illustrates an exemplary storage subsystem 60 (e.g., primary system 110a) including a storage controller 62 configured to handle data read/write requests and a storage unit 63 including a recording medium for storing data in accordance with write requests. The controller 62 includes a host channel adapter 64 coupled to a host computer (e.g., host 100a), a subsystem channel adapter 66 coupled to another subsystem (e.g., storage system 110c or 110b), and a disk adapter 68 coupled to the storage unit 63 in the storage subsystem 60. In the present embodiment, each of these adapters includes a port (not shown) to send/receive data and a microprocessor (not shown) to control the data transfers via the port.

The controller 62 also includes a cache memory 70 used to temporarily store data read from or to be written to the storage unit 63. In one implementation, the storage unit is a plurality of magnetic disk drives (not shown).

The subsystem provides a plurality of logical volumes as storage areas for the host computers. The host computers use the identifiers of these logical volumes to read data from or write data to the storage subsystem. The identifiers of the logical volumes are referred to as Logical Unit Number ("LUN"). The logical volume may be included in a single physical storage device or a plurality of storage devices. Similarly, a plurality of logical volumes may be associated with a single physical storage device. A more detailed description of storage subsystems is provided in U.S. patent application Ser. No. 10/394,631 (now U.S. Pat. No. 6,950,915), entitled "Data Storage Subsystem," filed on Mar. 21, 2003, claiming priority to Japanese Patent Application No. 2002-163705, filed on Jun. 5, 2002, assigned to the present Assignee, which is incorporated by reference.

Referring back to FIG. 1A, in the present embodiment, the write data is sent synchronously between the primary system 110a and intermediary 110c, and asynchronously between the intermediary system 110c and secondary system 110b. Accordingly, the intermediary system 110c is generally located relatively close to the primary system 110a when compared to its distance from the secondary system 110b. For example, the intermediary system is located about 5 miles or less, or 10 miles or less, or 20 miles or less from the primary system. In one embodiment, the intermediary system is no more than 100 miles apart from the primary system. In comparison, the intermediary system is located about 50 miles or more, or 100 miles or more, 200 miles or more, or in a different continent from the secondary system according to one embodiment of the present invention.

The remote copy system includes a primary host 100a coupled to the primary storage system 110a via a communication link 130a, and a secondary host 100b couple to the secondary storage system 110b via a communication link 130b. The primary host includes an application program (APP) 102 to access (read and write) storage areas or volumes in the primary storage system 110a. In one embodiment, the APP 102 is operable to fails over to the secondary host 100b if the primary host 100a or/and primary storage system 110a become unavailable (i.e., experiences failure) in order to provide uninterrupted access to data to users, particularly enterprise businesses. A remote copy management software (RCM) 101 runs on both of the hosts 100a and 100b to provide user and/or application interface for controlling the remote copy system.

The system 50 includes three types of volumes. The primary storage system includes one or more primary volumes (PVOL) 111a. PVOL 111a includes production data that APP 101 reads and writes. The secondary storage system includes one or more secondary volumes (SVOL) 111b. SVOL 111b includes copy data of PVOL 111a. The intermediary storage system includes one or more journal volumes (JVOL or JNL) 112. JVOL 112 stores write data written to PVOL 111a and corresponding control data thereof.

Figure 2:
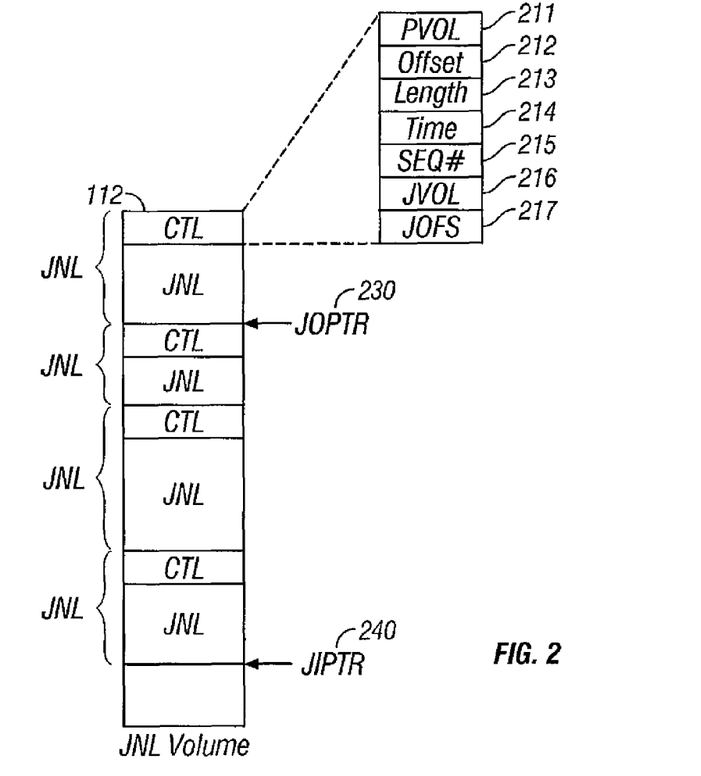
FIG. 2 illustrates a journal volume provided in an intermediary storage system according to one embodiment of the present invention.

FIG. 2 illustrates an exemplary JNL volume or JVOL 112 according to one embodiment of the present invention. JVOL is configured to store a journal or journal information used in performing a remote copy. The journal includes a pair of journal data and its control data. Journal data corresponds to the data stored on PVOLs 111a or data written to PVOL from host 100. The control data contains administrative information relating to corresponding journal data.

In the present embodiment, the control data and journal data are both stored in the same journal volume in a sequential manner, i.e., the journals received are stacked onto one another in a FIFO memory. The intermediary storage system may include a plurality of such FIFO memories. In one embodiment, first control data is first stored in the volume 112, and first journal data corresponding thereto is stored in the same volume. Then a second control data is stored next to the first journal data, and second journal data corresponding to the second control data is stored next thereto, and so on.

Figure 4:
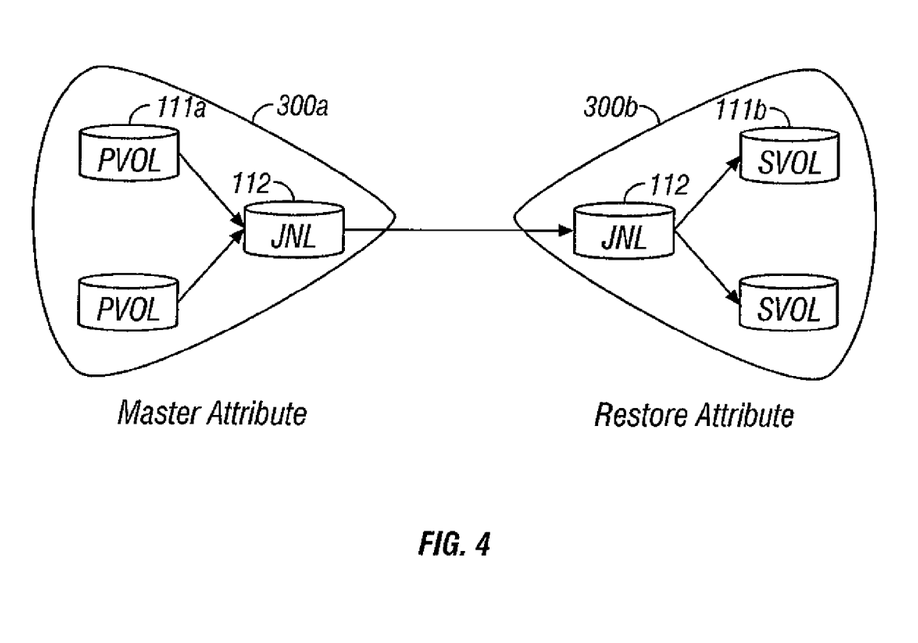
FIG. 4 illustrates journal groups having master and restore attributes according to one embodiment of the present invention.

The control data includes an index (IDX) 211' that is an identifier for PVOL 111a from which journal data is derived, e.g., the unique number assigned for PVOL in the primary storage system 110a or in a journal group 300a (FIG. 4). An address 212' provides an offset address in the PVOL, from which the write data is written, e.g., starting logical block address (LBA) of the write data. A length 213' provides the length of the write data, e.g., the number of logical blocks or total bytes of the write data. A time 214' indicates the time when a host writes data to PVOL 111a. A sequence number (SEQ#) 215' provides the sequence information of the write. That is, the sequence number provides write ordering within the primary storage system 110a. A JVOL identification (JVOL_ID) 216' identifies the journal volume that contains corresponding journal data, e.g., a unique number assigned to the journal volume in primary storage system or in the journal group 300a. A journal offset (JOFS) 217' provides the offset address in the journal volume from which the journal data is stored or starting address of journal data. Alternatively, the control data may not include the JVOL_ID 216' and JOFS 217' since the control data is stored adjacent to the corresponding journal data.

The intermediary storage system 110c maintains two pointers a first pointer (JOPTR) 230 and a second pointer (JIPTR) 240. JOPTR 230 points to a journal that is to be sent to the remote storage system 110b. JIPTR 240 points to an address to where next journal received from the primary system is to be stored. Accordingly, JIPTR 240 should not get ahead of JOPTR 230 to prevent new journals from overwriting the journals that have not yet been sent to the remote storage system 110b.

As will be explained in connection with FIG. 8, the intermediary storage system 110c allocates a space on a journal volume. This space allocation is performed by adding the length of the control data and journal data to the JIPTR 820, i.e., Next JIPTR=JIPTR+(length of control data and journal data).

As described previously, when the intermediary storage system 110c receives a JNLWR command from the primary storage system 110a, it allocates a space on the JNL volume 112 along with a space on the cache memory in order to store the control data and journal data. When a journal is stored to the cache memory, the intermediary storage system 110c sends the completion of the JNLWR command. The journal is stored to the JNL volume 112' subsequently.

Figure 3:
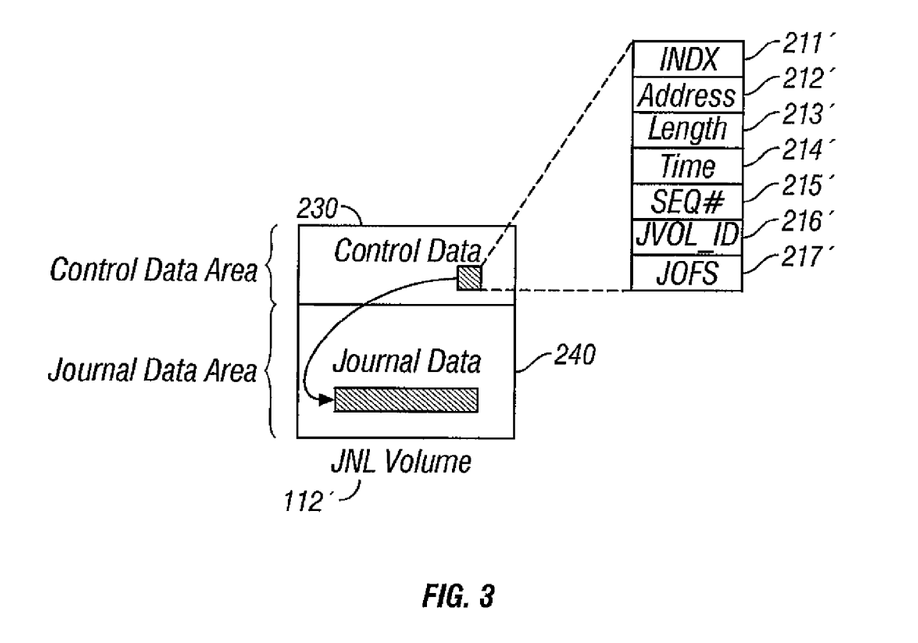
FIG. 3 illustrates a journal volume provided in an intermediary storage system according to another embodiment of the present invention.

FIG. 3 illustrates JNL volume or JVOL 112' according to another embodiment of the present invention. As explained above, JVOL is configured to store a journal or journal information used in performing a remote copy. The journal includes a pair of journal data and its control data. The control data is stored in a control data area 230 of the JVOL 112', and the journal data is stored in a journal data area 240 of the JVOL 112'. In one embodiment, the JVOL is a first-in-first-out (FIFO) storage, so that the control data and journal data are read out according to its order of receipt.

In one implementation, the control data includes an index (IDX) 211' that is an identifier for PVOL 111a from which journal data is derived, e.g., the unique number assigned for PVOL in the primary storage system 110a or in a journal group 300a (FIG. 4). An address 212' provides an offset address in the PVOL, from which the write data is written, e.g., starting logical block address (LBA) of the write data. A length 213' provides the length of the write data, e.g., the number of logical blocks or total bytes of the write data. A time 214' indicates the time when a host writes data to PVOL 111a. A sequence number (SEQ#) 215' provides the sequence information of the write. That is, the sequence number provides write ordering within the primary storage system 110a. A JVOL identification (JVOL_ID) 216' identifies the journal volume that contains corresponding journal data, e.g., a unique number assigned to the journal volume in primary storage system or in the journal group 200. A journal offset (JOFS) 217' provides the offset address in the journal volume from which the journal data is stored or starting address of journal data. The control data also includes JOFS 217' and JVOL_ID 216' since the control data and the journal data are stored in separate areas in the present embodiment.

There are two types of journals: update journal and base journal. The update journal is journal for data written from a host. Journal is taken when a host writes data to PVOL 111a. The base journal is journal for preexisting data that has been residing on PVOL 111a prior to pairing. The base journal is taken when a new copy of PVOL is created or resynchronization is necessary.

FIG. 4 illustrates a journal group according to one embodiment of the present invention. The journal group is a set of volumes (one or more volumes) for which journal is to be generated. A volume can be a member of only one journal group 300. Journal Group 300 includes one or more data volumes 111 or one or more journal volumes.

Journal group 300 has attribute of either Master or Restore. A master journal group 300a generates journal while a restore journal group 300b restores journal to SVOLs 111b. The master journal group is associated with the primary storage system 110a and includes one or more PVOLs 111a, and optionally includes one or more journal volumes. The restore journal group is associated with the secondary storage system 110b and includes one or more SVOLs 111b, and optionally includes one or more journal volumes.

The journal group may also have an Intermediary attribute (not shown), e.g., the JVOL 112. In the present embodiment, the intermediary journal group has been grouped with the master journal group and the restore journal group. Such an intermediary journal group (not shown) is associated with the intermediary storage system 110c and includes one or more JVOLs, and optionally includes one or more SVOLs 111b.

Figure 5:
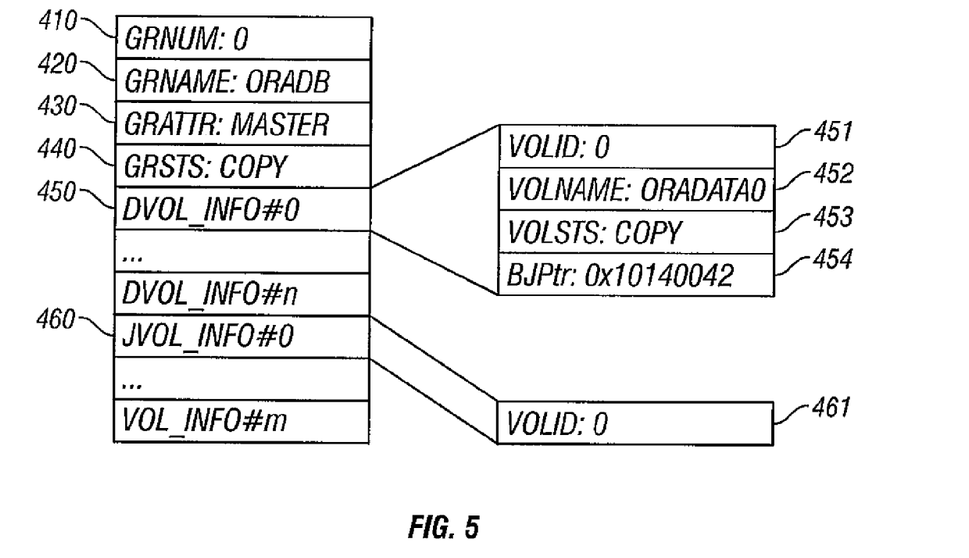
FIG. 5 illustrates a journal group table maintained by storage systems in the remote copy system of FIG. 1.

FIG. 5 illustrates a journal group (JNLG) table 400 according to one embodiment of the present invention. The storage system creates and maintains JNLG table 400 when its corresponding journal group is created. FIG. 5 shows the contents of JNLG table 400 maintained by the primary storage system 110a, secondary storage system 110b and intermediary storage system 110c.

A journal group number (GRNUM) 410 indicates a number uniquely assigned to the journal group within the storage system 110. A journal group name (GRNAME) 420 indicates the name assigned to the journal group, typically by a user. If two or more journal groups have the same GRNAME 420, then they have the remote mirroring relationship. A journal group attribute (GRATTR) 430 indicates the attribute assigned to the journal group, e.g., MASTER, INTERMEDIARY or RESTORE. As explained above, a master journal group generates journal from data volumes (PVOLs) in the journal group. An intermediary journal group is a transitional journal group between the master and restore journal groups. A restore journal group restores journal from journal volumes to data volumes (SVOLs).

A group status (GRSTS) 440 indicates the status of the journal group. The journal group may have the following status: COPY, PAIR, SUSP, and SMPL. The COPY status indicates that there is a data volume in the journal group from which base journal is taken. That is, the data stored in the PVOL prior to the pairing (i.e., preexisting data stored in the base journal) has been retrieved for copying to the SVOL. The PAIR status indicates that all preexisting data have been copied to the SVOL and the journal group is or has retrieved updated data from the update journal for copying to the SVOL. The SUSP or suspend status indicates that the journal group has suspended taking or retrieving updated data from the update journal. The SMPL status indicates that no volume in the journal group has started taking the preexisting data from the base journal, i.e., the remote copy is to begin.

An array (DVOL_INFO) 450 stores information about all data volumes in the journal group. Each entry of the array contains the following information: a volume identification (VOLID) 451 that is uniquely assigned to the volume in the storage systems 110 (VOLID 451 generally has an integer value); a volume name (VOLNAME) 452 assigned to the volume by a user; a volume status (VOLSTS) 453 indicating the status of the volume, e.g., COPY, PAIR, SUSP, SMPL, and others; and a pointer (BJPtr) 454 keeps track of the progress of taking the base journal. The data volume in a journal group is assigned a unique index in the group for indexing the DVOL_INFO 450.

An array (JVOL_INFO) 460 stores information relating to all journal volumes in the journal group. JVOL_INFO 460 includes VOLID 461, the identifier of a journal volume 112. The journal volume in a journal group is assigned a unique index in the group for indexing the JVOL_INFO 450 array.

Figure 6:
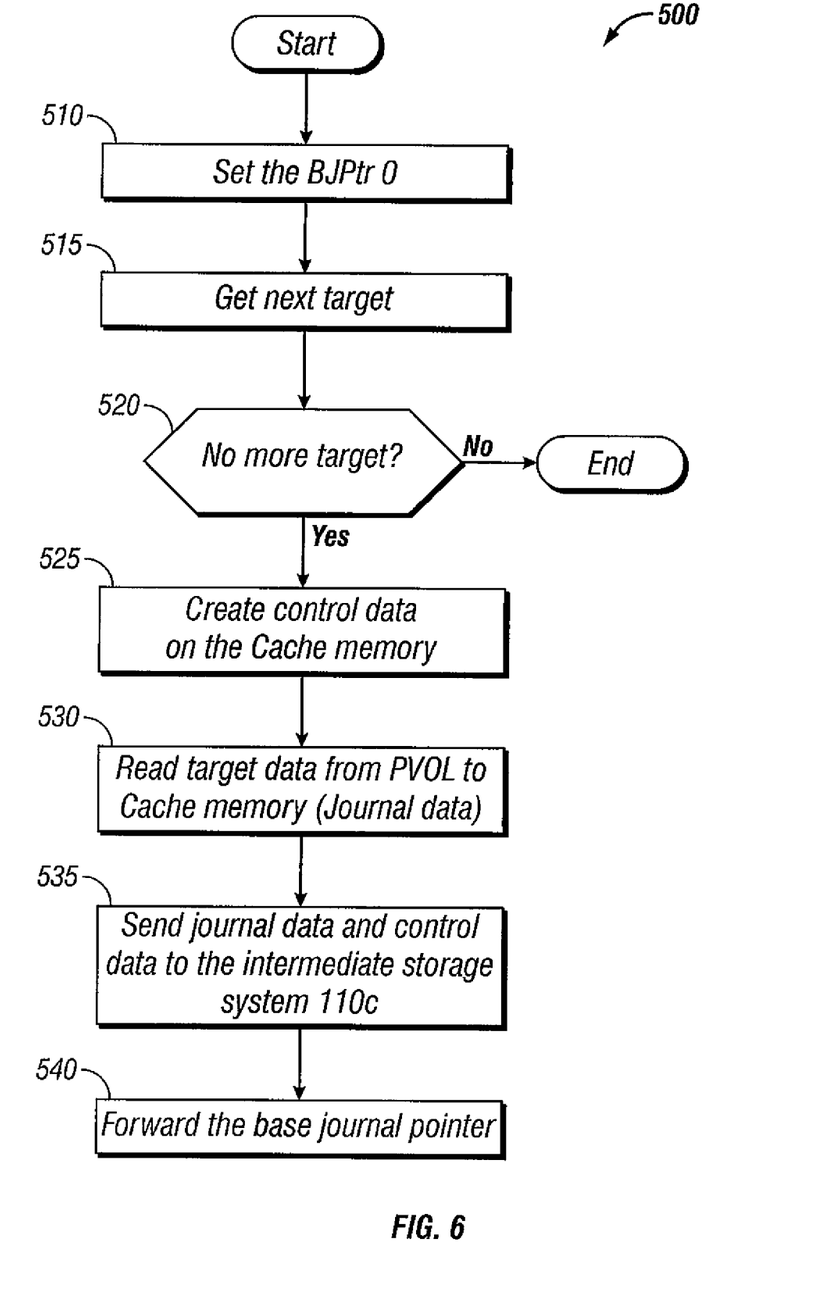
FIG. 6 shows a process for generating a base journal according to one embodiment of the present invention.

FIG. 6 illustrates a process 500 for generating a base journal according to one embodiment of the present invention. The process 500 is also referred to as an initial copy process. A base journal is taken when a user issues the PAIR_CREATE or PAIR_SYNC command. The PAIR_CREATE command causes a first volume in the primary storage system to be paired to a second volume in the secondary storage system. In the present embodiment, two data volumes are in the pair relationship if the following conditions are satisfied: (1) two JNL groups 300 maintained in the primary storage system 110a and the secondary storage system 110c have the same GRNAME 420; (2) one of the two JNL groups 300 in the primary storage system 110a has the MASTER attribute in GRATTR 430, and the other in the secondary storage system 110c has the RESTORE attribute; (3) two data volumes from the two JNL groups 300 have the same index number. The PAIR_SYNC command causes the paired volumes to be synchronized or mirrored, so that they both have identical data.

The primary storage system performs the process 500 upon receiving one of these two commands. At step 510, a base journal pointer (BJPtr) 454 is initialized to start taking base journal from the first data (e.g. first block, track, chunk of blocks or any addressable data on the data volume) in the data volume. A next target it retrieved (step 515). The next target is obtained from the value of BJPtr 454. For example, the next target is j-th block if BJPtr 454 has j. In one embodiment, a journal is taken for several blocks of data at a time for more efficient processing. Accordingly, the next target after the j-th block is n blocks from the j-th block in the present example. The process determines whether there is additional target (step 520). The process 500 ends if no more target exists, i.e., all base journals have been taken.

However, if an additional target exists, a control data for the target blocks is created (step 525). The created control data is stored in a cache memory in the primary storage system 110a. The target data is read from PVOL to the cache memory (step 530). After reading the target data, the control data is validated. The control data includes the following information: IDX 211, Address 212, and Length 213. Other information may be included as well.

The journal data and control data are sent to the intermediary storage system 110c (step 535). Generally, only journals (a pair of control data and journal data) that have been validated in step 530 are transmitted to the intermediary system. In one embodiment, a plurality of validated journals are sent together in a single command. BJPtr 454 is incremented to the next target after successfully transmitting the journals (step 540). That is, BJPtr 454 is incremented to be j+n. Steps 515 and 540 are repeated until no more target exists.

Figure 7:
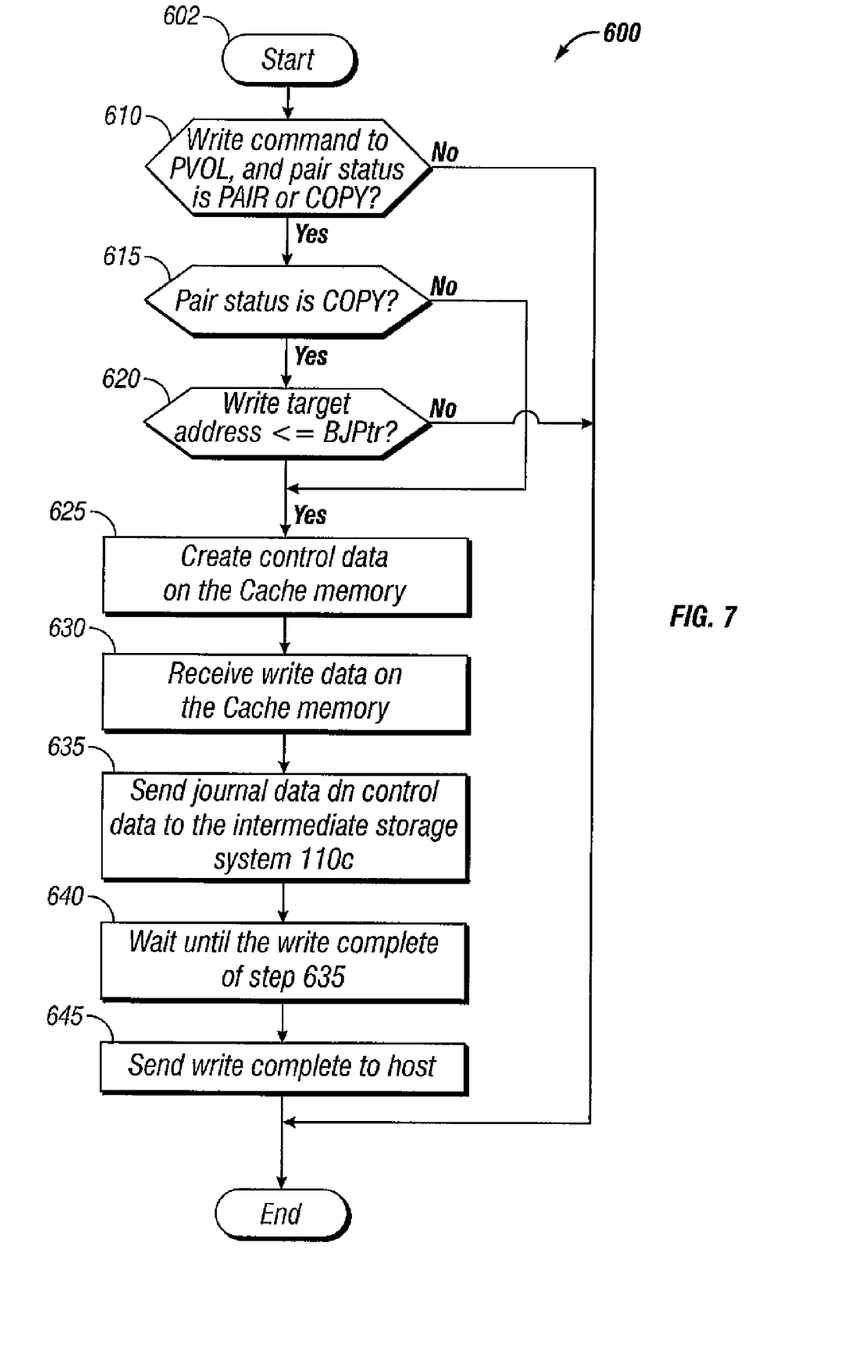
FIG. 7 shows a process for generating an update journal according to one embodiment of the present invention.

FIG. 7 illustrates a process 600 for generating update journal according to one embodiment of the present invention. The process 600 is also referred to as an update copy process. The process 600 commences after the PAIR_CREATE or PAIR_SYNC command is issued by a user (step 602). That is, the primary storage system starts taking update journal. Step 602 is performed after the process 500 if the PVOL has preexisting data.

The primary storage system 110a determines whether a write command has been received (step 610). All read commands are ignored at this time. The storage also determines if the pair status of PVOL is COPY or PAIR. If the these conditions are satisfied, the primary storage system checks if the pair status is COPY (step 615). If so, it is checked to determine if base journal has already been taken for the write target address (step 620). This is done by examining the pointer BJPtr 454. That is, if (Write Target Address)<=BJPtr 454, then the process 600 proceeds to step 625.

If step 620 is true or step 615 is false, i.e., the process of taking base journal has been completed, then update journal is taken for the write. For this purpose, the control date is first created. The control data includes IDX 211, address 212, and length 213. The write commands includes the address 212 and length 213. Other information may be included in the control data.

Write data is received from the host and stored in a cache memory (step 630). The write data corresponds to the journal date associated with the control data created at step 625. The control data and journal data are transmitted to the intermediary storage system 110c (step 635). The process 600 waits for an acknowledgement from the intermediary storage system 110c (step 640). The write completion is send to the host upon receiving the acknowledgement (step 645). The storage of the write data to the primary and intermediary systems are guaranteed since the write completion is not notified to the host until the acknowledgement from the intermediary system has been received.

Figure 8:
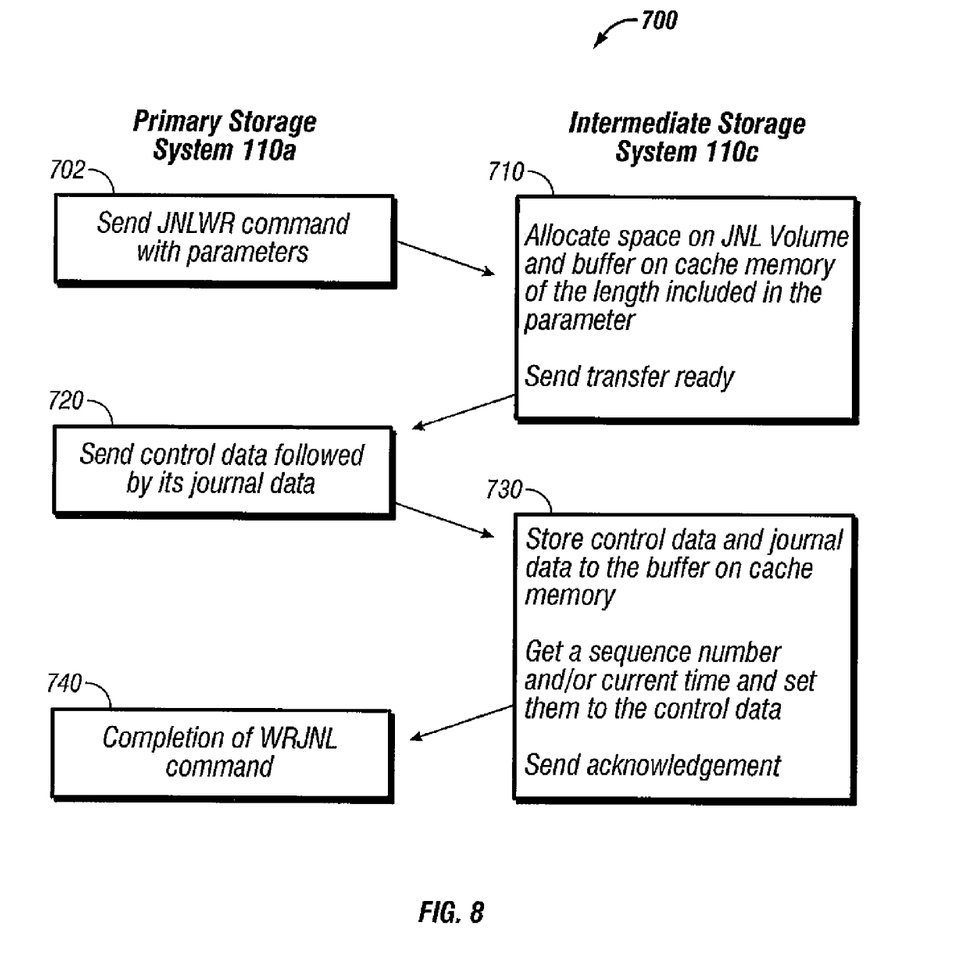
FIG. 8 shows a process for transferring a journal from a primary storage system to an intermediary storage system according to one embodiment of the present invention.

FIG. 8 illustrates a process 700 for transferring journal information including control data and journal data to the intermediary storage system 110c according to one embodiment of the present invention. The primary storage system 110a issues a JNL Write command (JNLWR command) to send journal data to the intermediary storage system 110c (step 702). In one embodiment, the command includes one or more parameters, e.g., the length of journal data. The length of control data is not included in the command parameter since a fixed data length, e.g., 64 byte, is used for the control data in the present embodiment. Alternatively, the control data of variable length may be used in which case information on its length would need to be included in the parameter.

The intermediary storage system 110c allocates a storage space on a JNL volume according to the information provided in the command parameter (step 710). The space allocation is also performed on a cache memory buffer to improve write performance, as explained in more detail later. The allocated buffer is associated with the allocated storage space in the volume. A transfer-ready packet or message is sent to the primary storage system 110a once the storage allocation has been performed.

The primary system transfers the journal information to the intermediary system upon receipt of the transfer-ready packet (step 720). In one embodiment, the control data is sent first and then the journal data.

The intermediary system stores the control data and journal data to the buffer on the cache memory (step 730). The journal is eventually stored in the allocated JNL volume in the intermediary system when the primary storage system 110b is idle according to the buffer-storage association performed at step 720. In addition, a sequence number and/or current timestamp are assigned to the journal, i.e., attached to the control data. The sequence number is sequentially assigned to journals received (from the primary system) and stored in the JNL volume. The sequence number provides the order of the journals received from the primary system, which is helpful in a data recovery process. In the present embodiment, the intermediary system 110c attaches the sequence number to the journals and otherwise manages the sequence number. A counter 152 is provided in the intermediary system to attach the sequence numbers to the journals transmitted by the primary system 110a (see, FIG. 1). A timestamp is also attached to the journals to indicate the time it was received by the intermediary storage system 110c. In another embodiment, the sequence information is attached to the journals at the primary system prior to transmitting them to the intermediary system. Similarly, the timestamp may also be attached to the journals by the primary system to indicate the time they were transmitted to the intermediary system. Once the journal has been properly received and stored, the intermediary system sends an acknowledge of the safe receipt of the journal to the primary system. Thereafter, the primary storage system 110a issues a completion of Write Journal command.

Figure 9:
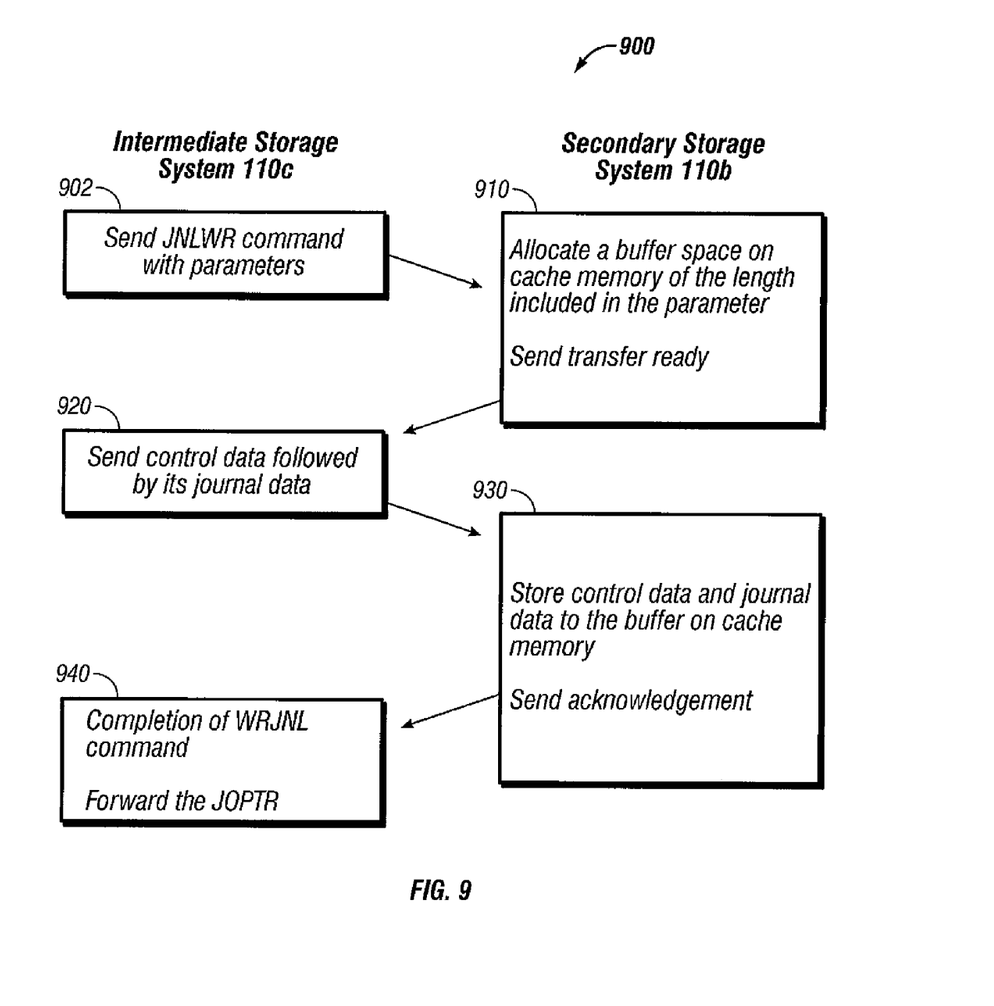
FIG. 9 illustrates a process for sending a journal from an intermediary storage system to a secondary storage system according to one embodiment of the present invention.

FIG. 9 illustrates a process 900 for sending journal from the intermediary storage system 110c to the secondary storage system 110b according to one embodiment of the present invention. In the present embodiment, journals stored in a JNL volume 112 of the intermediary storage system 110c are sent to the secondary storage system 110b asynchronously from the write commands of the primary storage system 110a, e.g., in between write commands from the primary system.

The process 900 is similar to the process 700 relating to the journal transfer from the primary system to the intermediary system. A JNL WR command with parameters is issued from the intermediary system to the secondary storage system (step 902). The secondary system allocates a buffer space on its cache memory according to the data length specified by the parameters and sends a transfer-ready notification back to the intermediary system (step 910). The intermediary system sends a journal including control data and its corresponding journal data (step 920). In one embodiment, the control data is first transmitted, followed by the journal data. The secondary system stores the journal to the allocated buffer space and sends an acknowledgement of the receipt of the journal to the intermediary system (step 930). The journal data is stored in a SVOL based on the sequence number and timestamp assigned at step 730 of the process 700. For example, a journal having a lower sequence number is restored before that having a higher sequence number. Upon receipt of the acknowledgement, the intermediary issues a WRJNL command to indicate the completion of the write data (step 940). A pointer associated with the journal volume in the intermediary system, e.g., JOPTR 810, is moved forward to the next batch of data to be copied to the secondary system.

Figure 10:
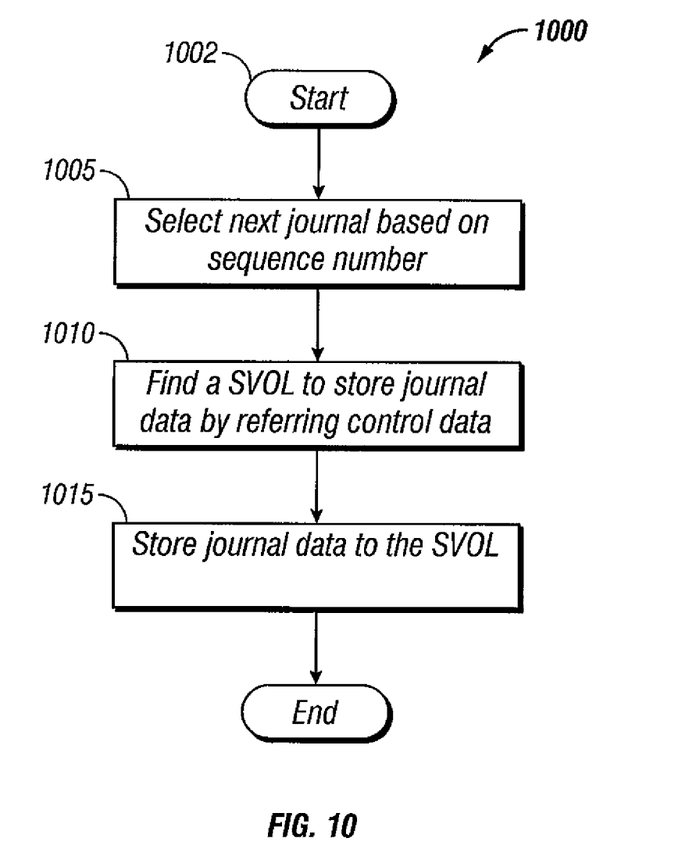
FIG. 10 illustrates a process for restoring journal in a secondary storage system according to one embodiment of the present invention.

FIG. 10 illustrates a process 1000 for storing journal data to a SVOL in the secondary storage system 110b using its corresponding control data according to one embodiment of the present invention. The secondary storage system 110b periodically invokes the process 1000 (step 1002) on JNL groups 300 with RESTORE attributes. In one embodiment, the process 1000 is invoked every ten seconds. A next journal including control data and journal data to be stored to the SVOL is selected using the sequence number (step 1005). For this purpose, the secondary storage system 110b keeps track of the sequence number of the journal that has restored, i.e., has its journal data stored to the SVOL. The secondary storage system determines the next journal to be restored by comparing the sequence number of the most recently restored journal with sequence numbers associated with the journals temporarily stored in the cache memory.

The control data of the journal selected at step 1005 is used to determine the storage area of the journal data, e.g., a particular SVOL and a location therein (step 1010). For example, the following information in the control data are examined: IDX 211, Address 212 and LENGTH 213. The IDX 211 indicates an index for PVOL 111a in the MASTER JNL group, i.e., the primary storage volume in the primary system. The journal data is stored in a SVOL that has the same index (step 1015). That is, the journal data is stored in the SVOL specified by the IDX 211 at the address indicated by the Address 212 for the length corresponding to the LENGTH 213. In the present embodiment, the control data is not stored in the SVOL since the storage locations of the journal data in the PVOL and SVOL are mirrored.

Figure 11:
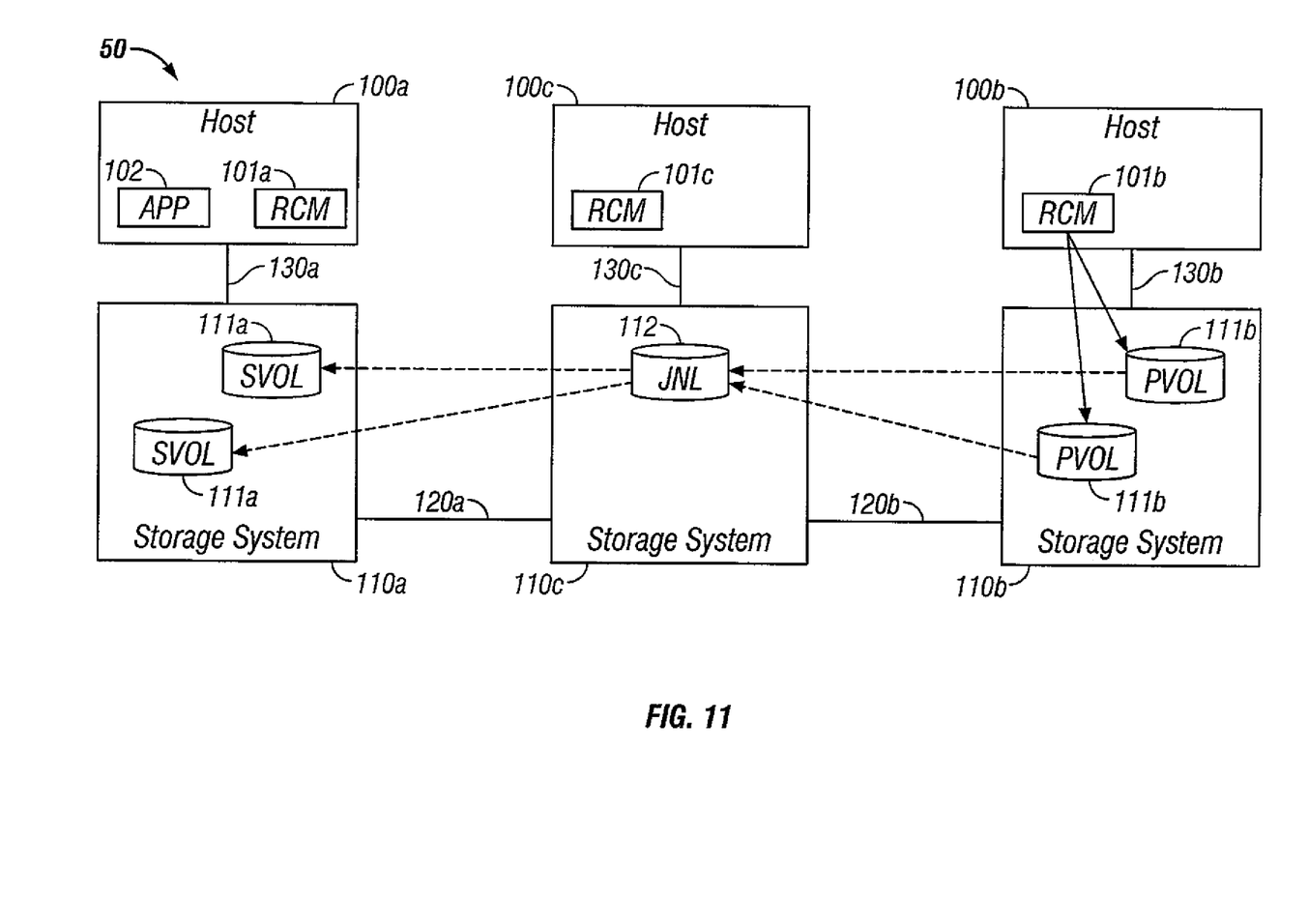
FIG. 11 illustrates a fail-over or fallback process implemented in a remote copy system according to one embodiment of the present invention.

FIG. 11 illustrates a fail-over implementation of the remote copy system 50 when the primary system 110a' experiences failure according to one embodiment of the present invention. A fail over refers to a situation or process where the primary storage system 110a or the host 100a or both go down and the secondary host 100c runs appropriate applications, whereby the secondary storage system functions as a new "primary" storage system. If the primary storage system 110a is still alive or when it is activated after the failure, it is required to keep mirroring between the two sites, by setting data volumes 111b in the secondary storage system 110b as PVOLs.

The intermediary storage system 110c' is used as an intermediary storage as before. However, since the intermediary storage system 110c may be located far from the secondary storage system 110b, the new primary system (i.e., the secondary system 110b) transmits journal asynchronously with respect to the write request of the host 100b. For this purpose, the process 600 is performed without step 635 and 640. That is, the journals are created synchronously but sent asynchronously with host write requests. A timestamp and sequence number are attached to the control data at the new primary system 110b prior to transmitting it to the intermediary system 110c. Accordingly, such steps need not be performed at the intermediary system during the fail over.

Figure 12:
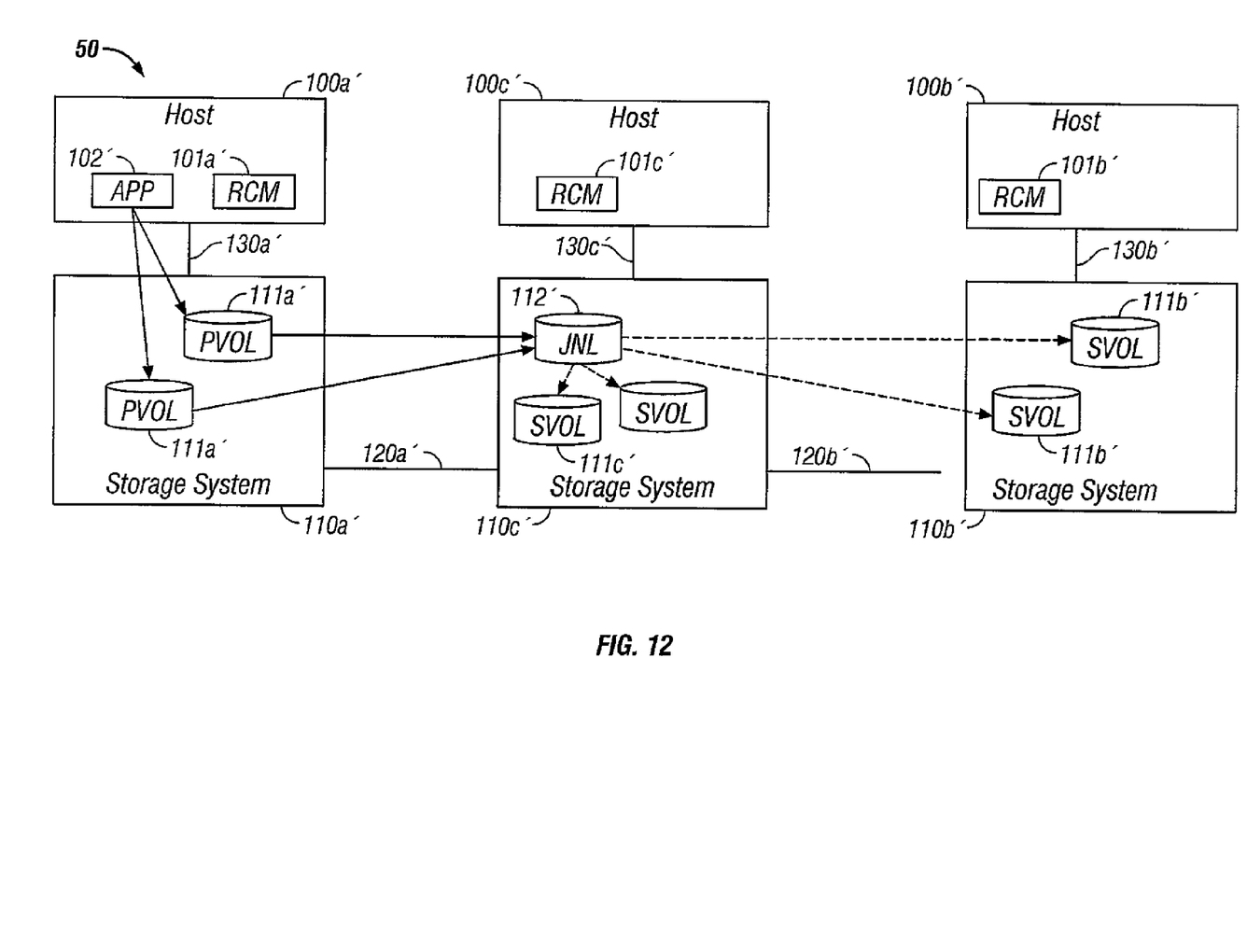
FIG. 12 illustrates a remote copy system according to another embodiment of the present invention.

FIG. 12 illustrates a remote copy system 50' according to another embodiment of the present invention. The system 50' includes a primary storage system 110a', a secondary storage system 110b', and an intermediary storage system 110c'. The primary storage system includes a plurality of volumes 111a' and is coupled to a primary host 100a' via a communication link 130a'. The primary host 100a' includes an application 102' and a RCM 101a'. The secondary system includes a plurality of volumes 111b' and is coupled to a secondary host 100b' via a communication link 130b'. The secondary system includes a RCM 101b'.

The intermediary system includes a journal volume 112' and a plurality of data volumes 111c'. In one implementation, the data volumes 111c' may be placed at remote location from the journal volume 112', e.g., in another storage system. An intermediary host 100c' is coupled to the intermediary system 110c' via a communication link 130c'. The intermediary host includes a RCM 101c'.

In the system 50', the intermediary system and the secondary system both mirror the primary system. The data mirroring in the intermediary system is performed using the processes 700, 900, and 1000 described above. The system 50' may fail over to the intermediary storage system 110c' or the secondary storage system 110b' when the primary storage system 110a goes down. In such a configuration, the intermediary storage system serves as a more efficient storage center than the secondary system since it is likely to be closer to the primary system and the users than the secondary system. During the fail over, the intermediary host 100c functions as a primary host, alone or in conjunction with the host 100a'.

The above detailed descriptions are provided to illustrate specific embodiments of the present invention and are not intended to be limiting. Numerous modifications and variations within the scope of the present invention are possible. Accordingly, the present invention is defined by the appended claims.

The invention claimed is:

1. A remote copy system, comprising:
    a first storage system including a first storage controller and a first data volume, the first storage controller being configured to receive a write request from a first host and to store write data associated with the write request to the first data volume;
    a second storage system coupled to the first storage system, including a second storage controller and a first storage area, the second storage controller receiving first data containing the write data to copy the stored data in the first data volume to the first storage area; and
    a third storage system coupled to the second storage system, including a third storage controller, a second storage area and a second data volume,
    wherein the write request from the first host to the first storage system completes after the second storage system completes a process of receiving the first data, and
    wherein the third storage controller is configured to complete a process of storing the first data received from the second storage system to the second storage area at a timing that is independent of a completion of processing of the write request from the first host.

2. The remote copy system of claim 1, wherein the first storage area temporarily stores the first data received from the first data volume.

3. The remote copy system of claim 1, wherein the first storage area is a cache memory.

4. The remote copy system of claim 1, wherein the second storage system further comprises a third data volume which stores the first data when the first storage system is idle.

5. The remote copy system of claim 1, further comprising:
a second host coupled to the second storage system, wherein the second storage system is configured to function as a primary storage system if the first storage system experiences a failure.

6. The remote copy system of claim 1, further comprising a third host coupled to the third storage system, wherein the third storage system is configured to replace the first storage system as a primary storage system if the first storage, system experiences a failure.

7. The remote copy system of claim 1, wherein the first data further includes a time when the write data are stored in the first data volume based on the write request from the first host.

8. The remote copy system of claim 1, wherein the first data is received at the second data volume after the write data are copied to the second storage system to secure the write data when the first storage system experiences a failure.

9. A remote copy method for a remote copy system, comprising:
receiving a write request from a first host;
storing write data associated with the write request to the first data volume in a first storage system;
receiving first data containing the write data to copy the stored data in the first data volume to a first storage area in a second storage system;
completing the write request from the first host to the first storage system after the second storage system completes a process of receiving the first data; and
completing a process of storing the first data received from the second storage system to a second storage area in a third storage system at a timing that is independent of a completion of processing of the write request from the first host.

10. The remote copy method of claim 9, wherein the first storage area temporarily stores the first data received from the first data volume.

11. The remote copy method of claim 9, wherein the first storage area is a cache memory.

12. The remote copy method of claim 9, wherein the second storage system further comprises a third data volume which stores the first data when the first storage system is idle.

13. The remote copy method of claim 9, wherein the second storage system is coupled to a second host and configured to function as a primary storage system if the first storage system experiences a failure.

14. The remote copy method of claim 9, wherein the third storage system is coupled to the a third host and configured to replace the first storage system as a primary storage system if the first storage system experiences a failure.

15. The remote copy method of claim 9, wherein the first data further includes a time when the write data are stored in the first data volume based on the write request from the first host.

16. The remote copy method of claim 9, wherein the first data is received at the second data volume after the write data are copied to the second storage system to secure the write data when the first storage system experiences a failure.

* * * * *